Figure 3:
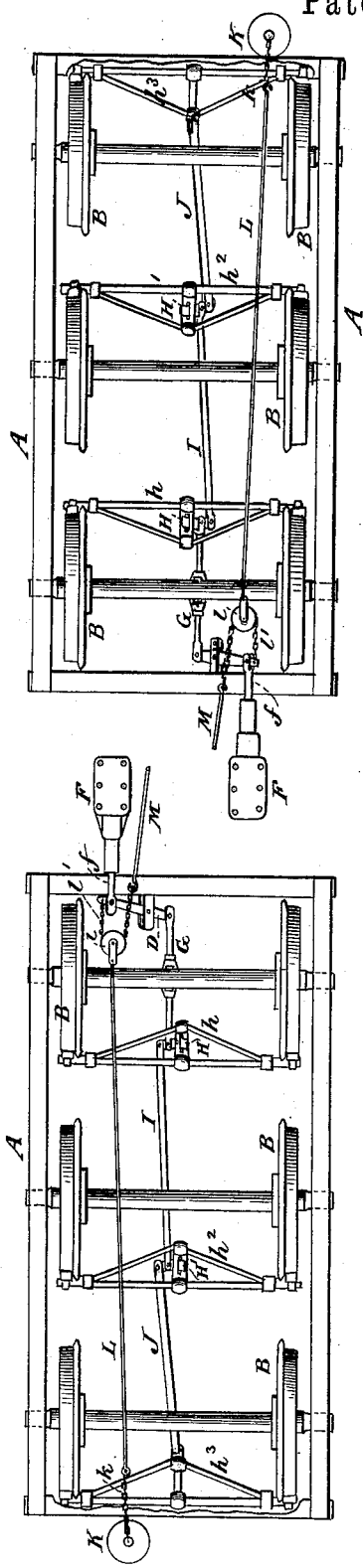

(No Model.) 2 Sheets—Sheet 1.
J. WEST.
CAR BRAKE.
No. 387,474. Patented Aug. 7, 1888.
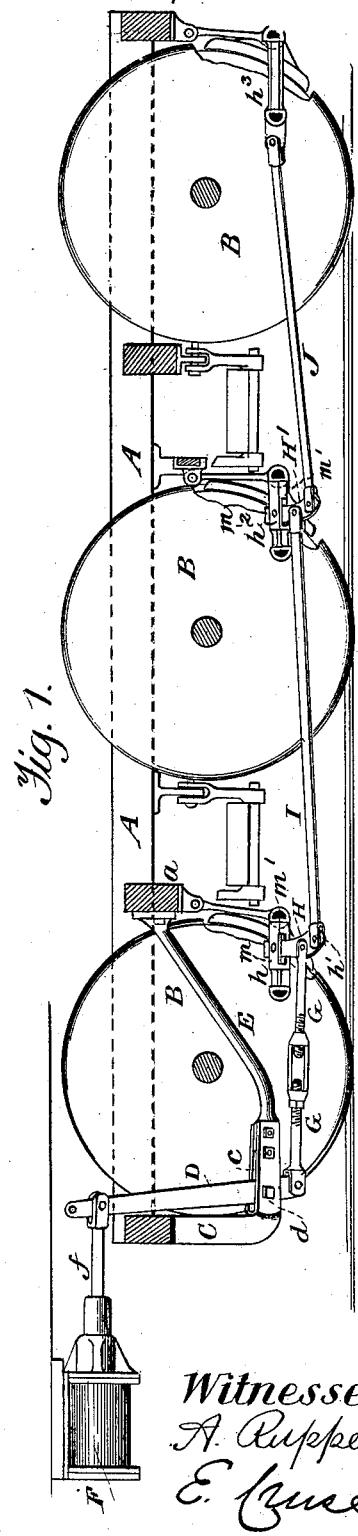
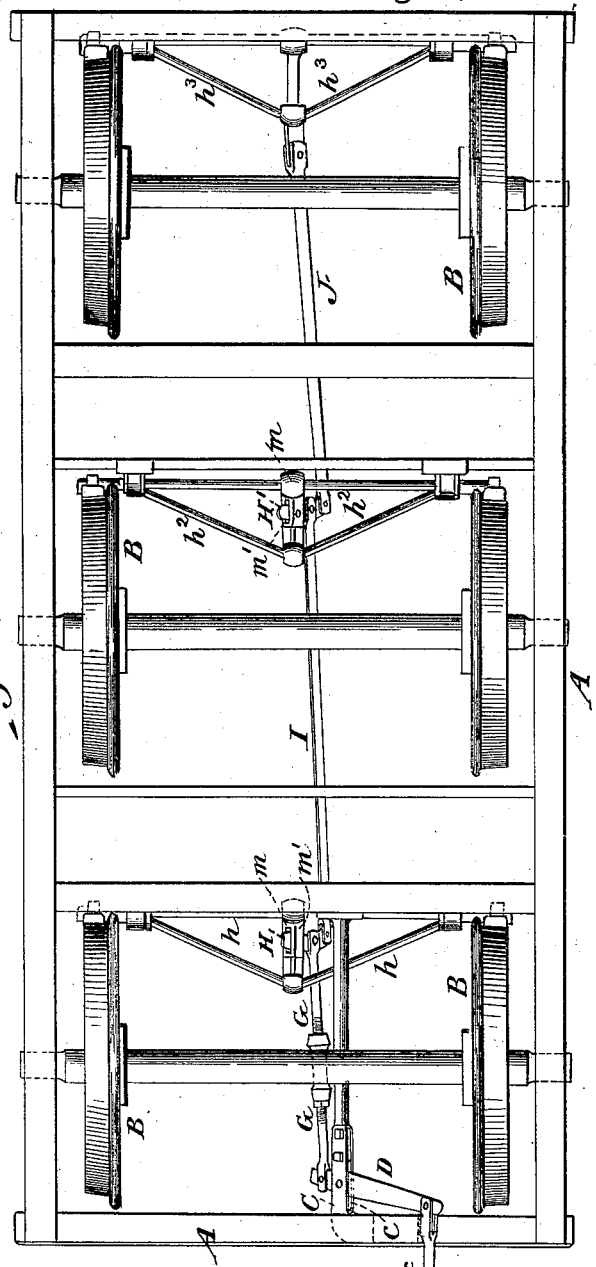
Witnesses:
A. Ruppert.
E. Cruse.
Inventor:
Joel West,
by G.H.W.T. Howard
atty.
N. PETERS. Photo-Lithographer, Washington, D. C.

(No Model.) 2 Sheets—Sheet 2.

J. WEST.
CAR BRAKE.

No. 387,474. Patented Aug. 7, 1888.

Witnesses:
A. Ruppert
E. Cruse

Inventor:
Joel West,
by Geo. W. T. Howard
Attys.

United States Patent Office.

JOEL WEST, OF BURLINGTON, IOWA.

CAR-BRAKE.

SPECIFICATION forming part of Letters Patent No. 387,474, dated August 7, 1888.

Application filed December 5, 1887. Serial No. 257,030. (No model.)

*To all whom it may concern:*

Be it known that I, JOEL WEST, of Burlington, in the county of Des Moines and State of Iowa, have invented certain new and useful Improvements in Brakes for Railway-Cars and Like Purposes, of which the following is a specification, reference being had to the accompanying drawings, and to the letters of reference marked thereon.

The object of my invention is to provide a system of brake mechanism whereby the brakes shall be applied to all the wheels of a truck or trucks simultaneously and with equal force; and this object I accomplish by connecting the brake-beams of two or more pairs of wheels of each truck by means of a single set of rods and equalizers, which latter are attached to the centers of the brake-beams, and also by providing at each truck a single fixed fulcrum for the operating-lever, the said lever being connected at one end to the first rod of the brake and equalizing system, and at the other to the source of power used in applying the brakes.

My invention consists in the several details of construction, and in the combination of parts, fully set forth in the following specification and claims.

In the drawings, Figure 1 is a longitudinal section, and Fig. 2 a plan, of a truck having my brake mechanism applied. Fig. 3 is a plan of two trucks, showing the brake mechanism adapted to be operated by hand-power as well as by fluid-pressure.

Similar letters of reference indicate similar parts in the respective figures.

A represents the truck-frame, and B B are the wheels.

C is a bent arm, one end of which is rigidly secured to the end of the truck-frame. The free end of the arm is slotted, as shown at $c$, and in this slot the lever D is pivoted by means of the bolt $d$.

E is a brace bolted at one end to the slotted end of the arm C, and having its other end rigidly secured to one of the cross-timbers $a$ of the truck-frame.

The upper and long arm of the lever D is suitably connected to the piston $f$ of the air or steam cylinder F, and also to the hand-brake devices, as will be hereinafter more fully described. By these means power for setting the brake is applied horizontally to the lever D.

The lower end of the lever D is connected by an adjustable rod, G, to the equalizer H, which is pivoted in the slot $m$ of the strut $m'$ at the center of the brake-beam $h$ of the first pair of wheels. The rod G is attached to the equalizer at a point two-thirds of the distance between the pivot on the brake-beam and the pivot $h'$ on the opposite end of the equalizer, where another rod I is attached, which runs to the center of a second equalizer, H', pivoted to the center of the brake-beam $h^2$ of the second pair of wheels. To the outer end of the equalizer H' is attached a third rod, J, which runs to the center of the brake-beam $h^3$ of the third pair of wheels.

Referring now to the connection of the lever D to the hand brake mechanism illustrated in Fig. 3, K K represent hand brake-wheels, and $k$ the chain which winds on the spindle or shaft of the hand-wheels.

L is a rod secured at one end to the chain $k$, and having at its other end a pulley, $l$, over which runs a chain, $l'$, one end of which is connected to the upper end of the lever D, while the other is attached to a rod, M, which connects with mechanism, like that above described, mounted on the next truck.

The operation will be easily understood. When the hand brake-wheels are used, the brakes will be applied to all the twelve wheels at once and with equal force, no matter which hand brake-wheel is used, the central rod, with the chains and pulleys, serving as an equalizer between the two trucks.

When the air or steam cylinders are used, each cylinder will apply the brakes to the wheels of one truck.

Having described my invention, I claim—

1. A truck and the brake-beams thereof, a lever having a fixed fulcrum in the truck, and a series of rods and equalizers operated by said lever, each equalizer being pivoted in the strut of a brake-beam, combined with an air or steam cylinder and suitable connections between said cylinder and the operating-lever, substantially as set forth.

2. The wheels, brakes, and brake-beams of two or more trucks, the brake-beams of two or more pairs of wheels of each truck being connected by means of a single set of rods and equalizers, combined with the hand brake-wheels K, chains $k$, rods L, pulleys $l$, chains $l'$, and rod M, whereby the brakes may be applied to all the wheels of the several trucks with equal force, whichever hand brake-wheel is used, substantially as set forth.

In testimony whereof I have hereunto set my hand and seal.

JOEL WEST. [L. S.]

Witnesses:
 N. S. AUGSBURGER,
 JACOB KASTLIN.